(12) United States Patent
Yamagishi

(10) Patent No.: US 9,374,620 B2
(45) Date of Patent: Jun. 21, 2016

(54) TERMINAL APPARATUS, SERVER APPARATUS, INFORMATION PROCESSING METHOD, PROGRAM, AND INTERLOCKED APPLICATION FEED SYSTEM

(71) Applicant: Sony Corporation, Tokyo (JP)

(72) Inventor: Yasuaki Yamagishi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 91 days.

(21) Appl. No.: 13/648,753

(22) Filed: Oct. 10, 2012

(65) Prior Publication Data

US 2013/0103716 A1  Apr. 25, 2013

Related U.S. Application Data

(60) Provisional application No. 61/549,775, filed on Oct. 21, 2011.

(51) Int. Cl.

| | |
|---|---|
| G06F 17/30 | (2006.01) |
| H04N 21/4722 | (2011.01) |
| H04H 60/23 | (2008.01) |
| H04H 60/73 | (2008.01) |
| H04H 60/74 | (2008.01) |
| H04N 21/434 | (2011.01) |
| H04N 21/462 | (2011.01) |

(Continued)

(52) U.S. Cl.
CPC .......... *H04N 21/4722* (2013.01); *H04H 60/23* (2013.01); *H04H 60/73* (2013.01); *H04H 60/74* (2013.01); *H04N 21/434* (2013.01); *H04N 21/462* (2013.01); *H04N 21/4622* (2013.01); *H04N 21/8126* (2013.01); *H04N 21/8133* (2013.01); *H04N 21/8358* (2013.01); *H04N 21/2353* (2013.01); *H04N 21/23892* (2013.01)

(58) Field of Classification Search
CPC ................................. G06F 17/30855
USPC ............ 707/769, 770, 809, 610; 725/110, 39, 725/136; 709/231
See application file for complete search history.

(56) References Cited

U.S. PATENT DOCUMENTS 6,421,713 B1 * 7/2002 Lamparter .................... 709/216
6,834,110 B1 * 12/2004 Marconcini et al. .......... 380/239

(Continued)

FOREIGN PATENT DOCUMENTS

JP 2006-050237 2/2006

OTHER PUBLICATIONS

U.S. Appl. No. 13/304,126, Nov. 23, 2011, Eyer.

(Continued)

*Primary Examiner* — Jeffrey A Burke
*Assistant Examiner* — Thong Vu
(74) *Attorney, Agent, or Firm* — Oblon, McClelland, Maier & Neustadt, L.L.P.

(57) ABSTRACT

Disclosed herein is a terminal apparatus including an extraction portion configured to extract from a content to be reproduced signature data representative of a characteristic of the content; a query generation portion configured to generate a query including the extracted signature data; a communication portion configured to transmit the generated query to a server apparatus and receive a response returned therefrom in reply to the query; and an application execution portion configured to acquire and execute an application corresponding to an application identifier included in the received response.

20 Claims, 9 Drawing Sheets

(51) Int. Cl.
*H04N 21/81* (2011.01)
*H04N 21/8358* (2011.01)
*H04N 21/235* (2011.01)
*H04N 21/2389* (2011.01)

(56) References Cited

U.S. PATENT DOCUMENTS

| | | | |
|---|---|---|---|
| 8,429,205 B2* | 4/2013 | Rhoads | 707/809 |
| 8,478,719 B2* | 7/2013 | Savenok et al. | 707/610 |
| 8,887,189 B2* | 11/2014 | Beyabani | H04H 60/80 725/17 |
| 2001/0031066 A1 | 10/2001 | Meyer et al. | |
| 2002/0199209 A1* | 12/2002 | Shiga | H04H 60/04 725/136 |
| 2003/0192060 A1 | 10/2003 | Levy | |
| 2004/0098398 A1* | 5/2004 | Ahn | G06F 17/30017 |
| 2004/0154039 A1* | 8/2004 | Simms et al. | 725/39 |
| 2005/0091268 A1 | 4/2005 | Meyer et al. | |
| 2005/0210526 A1 | 9/2005 | Levy et al. | |
| 2005/0246381 A1* | 11/2005 | DeCenzo et al. | 707/200 |
| 2006/0179153 A1* | 8/2006 | Lee et al. | 709/231 |
| 2006/0271482 A1* | 11/2006 | Bito | G06F 21/606 705/50 |
| 2008/0005349 A1* | 1/2008 | Li et al. | 709/231 |
| 2009/0106297 A1* | 4/2009 | Wright et al. | 707/102 |
| 2009/0150405 A1* | 6/2009 | Grouf et al. | 707/10 |
| 2009/0288125 A1* | 11/2009 | Morioka | 725/110 |
| 2009/0313353 A1* | 12/2009 | Lou | 709/219 |
| 2009/0319672 A1* | 12/2009 | Reisman | 709/227 |
| 2010/0008586 A1 | 1/2010 | Meyer et al. | |
| 2010/0131969 A1* | 5/2010 | Tidwell et al. | 725/14 |
| 2010/0211798 A1* | 8/2010 | Fahrny | 713/189 |
| 2011/0075990 A1 | 3/2011 | Eyer | |
| 2011/0088075 A1 | 4/2011 | Eyer | |
| 2011/0179477 A1* | 7/2011 | Starnes | G06F 21/52 726/9 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0289114 A1* | 11/2011 | Yu et al. | 707/769 |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0158898 A1* | 6/2012 | van Deventer et al. | 709/217 |
| 2012/0185888 A1 | 7/2012 | Eyer et al. | |
| 2012/0253826 A1 | 10/2012 | Kitazato et al. | |
| 2013/0145414 A1* | 6/2013 | Yamagishi | 725/110 |
| 2014/0089985 A1* | 3/2014 | Kawakita | H04H 20/28 725/53 |
| 2014/0344846 A1* | 11/2014 | Yamamura | H04N 21/2396 725/25 |

OTHER PUBLICATIONS

U.S. Appl. No. 13/452,376, Apr. 20, 2012, Kitahara, et al.
U.S. Appl. No. 13/562,946, Jul. 31, 2012, Eyer.
U.S. Appl. No. 13/559,166, Jul. 26, 2012, Eyer.
U.S. Appl. No. 13/490,216, Jun. 6, 2012, Eyer.
U.S. Appl. No. 13/554,688, Jul. 20, 2012, Eyer.
U.S. Appl. No. 13/559,188, Jul. 26, 2012, Kitazato.
U.S. Appl. No. 13/527,435, Jun. 19, 2012, Eyer.
U.S. Appl. No. 13/587,975, Aug. 17, 2012, Kitazato.
U.S. Appl. No. 13/593,554, Aug. 24, 2012, Kitazato et al.
International Search Report issued Jan. 28, 2013, in PCT/JP2012/006567, filed Oct. 12, 2012.

* cited by examiner

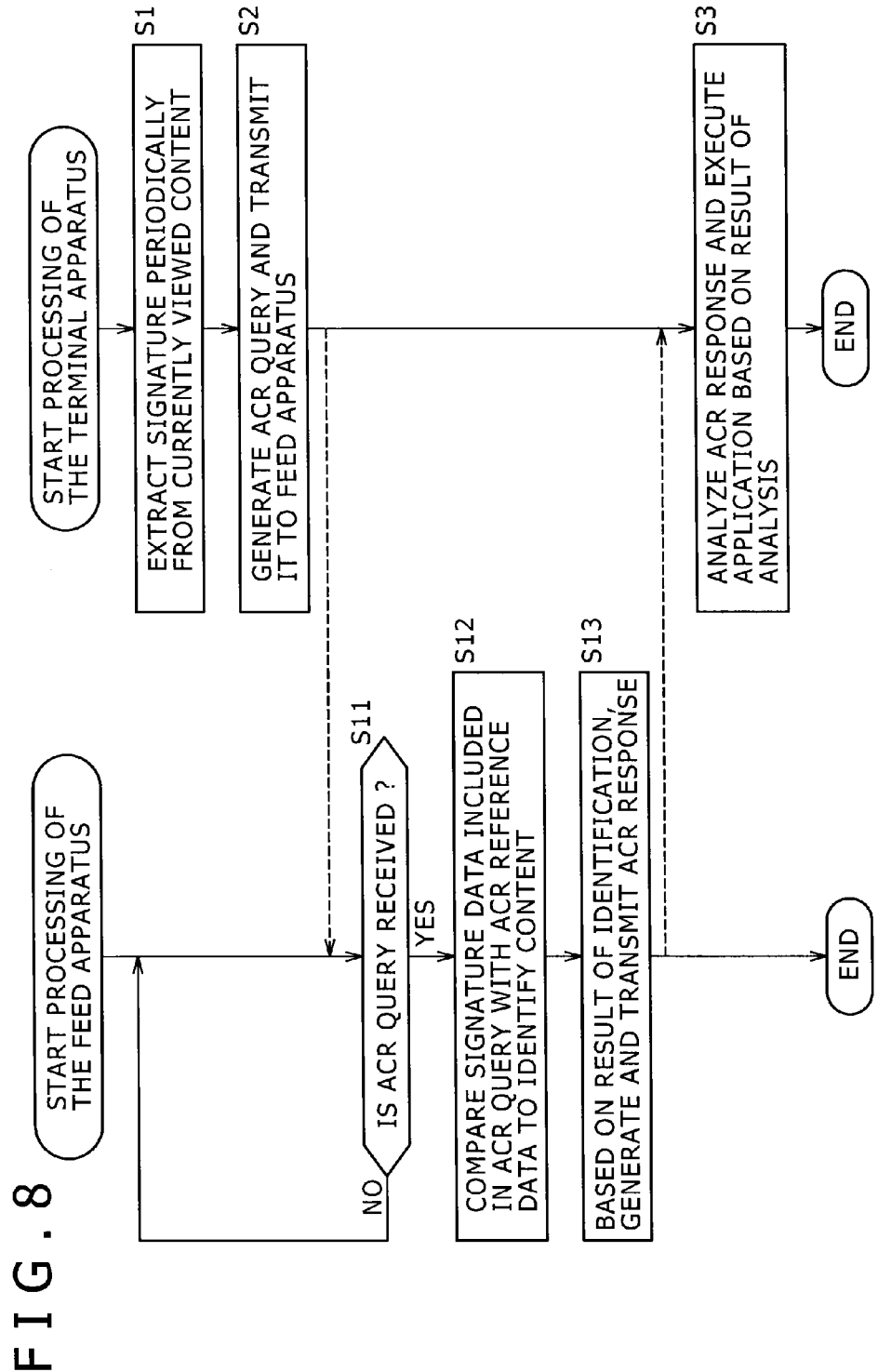

TERMINAL APPARATUS, SERVER APPARATUS, INFORMATION PROCESSING METHOD, PROGRAM, AND INTERLOCKED APPLICATION FEED SYSTEM

CROSS-REFERENCE TO RELATED APPLICATION

This application claims the benefit of priority of Provisional Application Ser. No. 61/549,775, filed on Oct. 21, 2011, the entire content of which is incorporated herein by reference.

BACKGROUND

The present disclosure relates to a terminal apparatus, a server apparatus, an information processing method, a program, and an interlocked application feed system. More particularly, the disclosure relates to a terminal apparatus, a server apparatus, an information processing method, a program, and an interlocked application feed system capable of executing an application program in interlocked relation to the progress of not only an ongoing TV (television) program but also a given content being viewed.

For example, consider providing a TV viewer currently viewing a TV program (simply called the program hereunder) with information about the program (the cast, an outline, a trailer, etc.) or information which is not directly related to the program but which is beneficial to the viewer (news, weather forecast, traffic information, etc.), displayed on the screen.

In order to implement the display of such information, it is only necessary to transmit to the TV set or the like commands for acquiring and activating dedicated application programs (simply called the application hereunder) in interlocked relation to the progress of the ongoing program. In fact, already in Japan and in Europe, that has become a reality with such commands or applications transmitted by use of a data transmission band of a TV broadcast signal (e.g., see Japanese Patent Laid-Open No. 2006-50237).

SUMMARY

Meanwhile, in the United States, the TV broadcast program has no such data transmission band, with no scheme provided to substitute for the lack. Thus there has yet to be a method established to execute the application in interlocked relation to the progress of the ongoing program.

Incidentally, in the United State, there are more households viewing the program via a CATV (cable television) or IPTV (internet protocol television) than those directly receiving and viewing the program on their TV sets. Since there are cases where only the video or audio of the program is extracted for distribution from TV broadcasts on CATV or IPTV, it is not guaranteed that a data broadcast signal containing application-related data will be sent to TV viewers even if the TV broadcast signal in the United States were furnished with a data broadcast band to accommodate that signal.

In view of the above circumstances, the present disclosure has been made in such a manner as to cause an application to be executed in interlocked relation to the progress of the content being viewed in a user's household.

According to a first embodiment of the present disclosure, there is provided a terminal apparatus including: an extraction portion configured to extract from a content to be reproduced signature data representative of a characteristic of the content; a query generation portion configured to generate a query including the extracted signature data; a communication portion configured to transmit the generated query to a server apparatus and receive a response returned therefrom in reply to the query; and an application execution portion configured to acquire and execute an application corresponding to an application identifier included in the received response.

Preferably, the query generation portion may generate the query including the extracted signature data and an extraction timestamp indicative of the timing at which the signature data was extracted; and either the application execution portion or the application executed thereby may perform a predetermined process by acquiring related metadata selected by the server apparatus based on the extraction timestamp included in the received response.

Preferably, the terminal apparatus may be incorporated in a reproduction apparatus configured to reproduce contents; and the terminal apparatus according to the first embodiment of the present disclosure may further include a content feed portion configured to feed the extraction portion with all contents to be reproduced by the reproduction apparatus.

According to the first embodiment of the present disclosure, there is provided an information processing method for use with a terminal apparatus, the information processing method including: causing the terminal apparatus to extract from a content to be reproduced signature data representative of a characteristic of the content; causing the terminal apparatus to generate a query including the extracted signature data; causing the terminal apparatus to transmit the generated query to a server apparatus and receive a response returned therefrom in reply to the query; and causing the terminal apparatus to acquire and execute an application corresponding to an application identifier included in the received response.

According to the first embodiment of the present disclosure, there is provided a program for causing a computer to function as an apparatus including: an extraction portion configured to extract from a content to be reproduced signature data representative of a characteristic of the content; a query generation portion configured to generate a query including the extracted signature data; a communication portion configured to transmit the generated query to a server apparatus and receive a response returned therefrom in reply to the query; and an application execution portion configured to acquire and execute an application corresponding to an application identifier included in the received response.

According to the first embodiment of the present disclosure, signature data is extracted from the content to be reproduced as representative of the characteristic of that content; a query is then generated in a manner including the extracted signature data; the generated query is transmitted to the server apparatus and the response returned therefrom in reply to the query is received; and the application corresponding to an application identifier included in the received response is acquired and executed.

According to a second embodiment of the present disclosure, there is provided a server apparatus including: a database configured to hold reference data associating signature data extracted from a content and representative of a characteristic of the content with a content identifier identifying the content from which the signature data was extracted and with an application identifier identifying an application to be executed in interlocked relation to the content; a response generation portion configured to identify in reference to the reference data the content from which was extracted the signature data included in a query transmitted from a terminal apparatus so as to generate a response including the application identifier identifying the application to be executed in interlocked relation to the identified content; and a transmission portion configured to transmit the generated response to the terminal apparatus.

Preferably, the database may hold the reference data associating the signature data extracted from the content and representative of the characteristic of the content with the content identifier identifying the content from which the signature data was extracted, with a reproduction time indicative of the timing at which the signature data was extracted, with the application identifier identifying the application to be executed in interlocked relation to the content, and with related metadata to be processed by the application; and the response generation portion may identify in reference to the reference data the content from which was extracted the signature data included in the query transmitted from the terminal apparatus, so as to generate the response including the application identifier identifying the application to be executed in interlocked relation to the identified content and the related metadata.

Preferably, the response generation portion may identify in reference to the reference data the content from which was extracted the signature data included in the query transmitted from the terminal apparatus, so as to generate the response including the application identifier identifying the application to be executed in interlocked relation to the identified content and the related metadata selected based on an extraction timestamp included in the query.

Preferably, the response generation portion may further generate the response including the content identifier representative of the identified content.

According to the second embodiment of the present disclosure, there is provided an information processing method for use with a server apparatus, the information processing method including: causing the server apparatus to receive a query transmitted from a terminal apparatus; causing the server apparatus to refer to reference data associating signature data extracted from a content and representative of a characteristic of the content with a content identifier identifying the content from which the signature data was extracted and with an application identifier identifying an application to be executed in interlocked relation to the content so as to identify the content from which was extracted the signature data included in the received query, before generating a response including the application identifier identifying the application to be executed in interlocked relation to the identified content; and causing the server apparatus to transmit the generated response to the terminal apparatus.

According to the second embodiment of the present disclosure, there is provided a program for causing a computer to function as an apparatus including: a database configured to hold reference data associating signature data extracted from a content and representative of a characteristic of the content with a content identifier identifying the content from which the signature data was extracted and with an application identifier identifying an application to be executed in interlocked relation to the content; a response generation portion configured to identify in reference to the reference data the content from which was extracted the signature data included in a query transmitted from a terminal apparatus so as to generate a response including the application identifier identifying the application to be executed in interlocked relation to the identified content; and a transmission portion configured to transmit the generated response to the terminal apparatus.

According to the second embodiment of the present disclosure, the query transmitted from the terminal apparatus is received; the reference data associating the signature data extracted from the content and representative of the characteristic of that content with the content identifier identifying the content from which the signature data was extracted and with the application identifier identifying the application to be executed in interlocked relation to the content is referenced so as to identify the content from which was extracted the signature data included in the query transmitted from the terminal apparatus, thereby generating the response including the application identifier identifying the application to be executed in interlocked relation to the identified content; and the generated response is transmitted to the terminal apparatus.

According to a third embodiment of the present disclosure, there is provided an interlocked application feed system including a terminal apparatus and a server apparatus; wherein the terminal apparatus includes an extraction portion configured to extract from a content to be reproduced signature data representative of a characteristic of the content; a query generation portion configured to generate a query including the extracted signature data; a communication portion configured to transmit the generated query to the server apparatus and receive a response returned therefrom in reply to the query; and an application execution portion configured to acquire and execute an application corresponding to an application identifier included in the received response; and the server apparatus includes a database configured to hold reference data associating the signature data extracted from the content and representative of the characteristic of the content with a content identifier identifying the content from which the signature data was extracted and with an application identifier identifying the application to be executed in interlocked relation to the content; a response generation portion configured to identify in reference to the reference data the content from which was extracted the signature data included in the query transmitted from the terminal apparatus so as to generate the response including the application identifier identifying the application to be executed in interlocked relation to the identified content; and a transmission portion configured to transmit the generated response to the terminal apparatus.

According to the third embodiment of the present disclosure, the terminal apparatus extracts the signature data from the content to be reproduced as representative of the characteristic of that content; the query including the extracted signature data is generated and transmitted to the server apparatus; the response returned from the server apparatus in reply to the query is received; and the application corresponding to the application identifier included in the received response is acquired and executed. And the server apparatus receives the query transmitted from the terminal apparatus; the reference data associating the signature data extracted from the content and representative of the characteristic of that content with the content identifier identifying the content from which the signature data was extracted and with the application identifier identifying the application to be executed in interlocked relation to the content is referenced so as to identify the content from which was extracted the signature data included in the received query, thereby generating the response including the application identifier identifying the application to be executed in interlocked relation to the identified content; and the generated response is transmitted to the terminal apparatus.

According to the first embodiment of the present disclosure, it is possible to execute an application in interlocked relation to the progress of a content being viewed in a user's household.

According to the second embodiment of the present disclosure, it is possible to execute the application in interlocked relation to the progress of the content being viewed in the user's household.

According to the third embodiment of the present disclosure, it is possible to execute the application in interlocked relation to the progress of the content being viewed in the user's household.

BRIEF DESCRIPTION OF THE DRAWINGS

FIG. 8 is a flowchart explanatory of how the interlocked application feed system operates.

DETAILED DESCRIPTION OF THE PREFERRED EMBODIMENTS

The best mode for carrying out the present disclosure (called the embodiment hereunder) will be described below in detail with reference to the accompanying drawings.
[Typical Configuration of the Interlocked Application Feed System]

Figure 1:
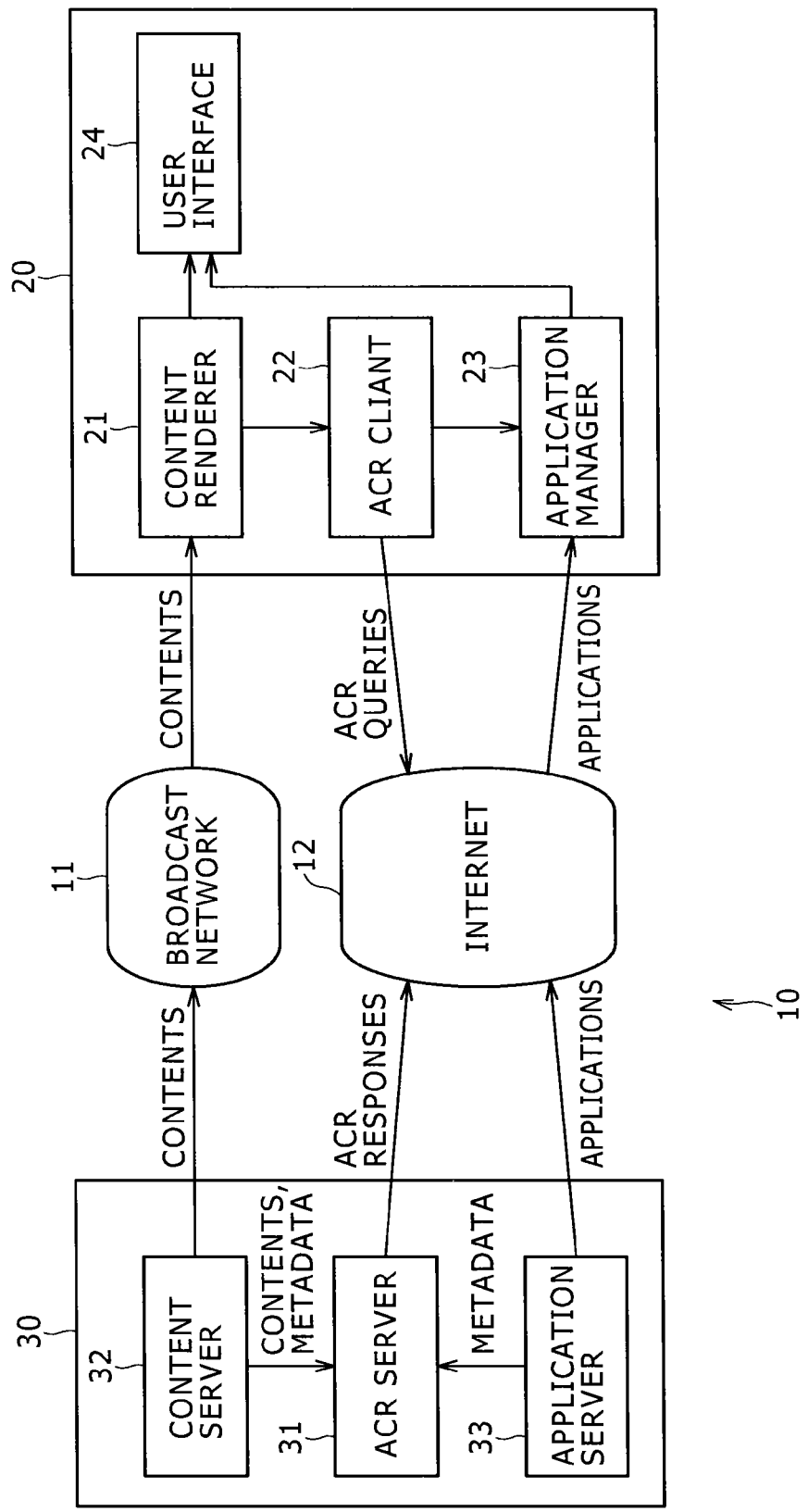
FIG. 1 is a block diagram showing a typical configuration of an interlocked application feed system as an embodiment of the present disclosure.

FIG. 1 shows a typical configuration of an interlocked application feed system as the embodiment of the present disclosure.

This interlocked application feed system 10 executes an application in interlocked relation to the program of the content being viewed. Executing the application makes it possible to display on the screen information about the currently viewed content (the cast, an outline, a trailer, etc.) or information which is not directly related to the content but which is beneficial to the user (news, weather forecast, traffic information, etc.), or to implement quizzes or polls that can be participated in by viewers on the screen.

Incidentally, the contents in the current context include all kinds of AV (audio and visual) contents such as the programs being broadcast on TV broadcast networks, CATV networks, and IPTV networks; programs reproduced from recordings; videos reproduced from package media; and videos distributed over the Internet.

The interlocked application feed system 10 is made up of a terminal apparatus 20 and a feed apparatus 30. Although only one terminal apparatus 20 is shown in FIG. 1, in practice it is incorporated in a content reproduction apparatus exemplified by each of the TV sets installed in numerous users' households.

The terminal apparatus 20 is connected to the feed apparatus 30 through broadcast networks 11 including TV broadcast networks, CATV networks, and IPTV networks and over the Internet 12.

The terminal apparatus 20 is made up of a content renderer 21, an ACR client 22, an application manager 23, and a user interface 24.

The content renderer 21 has the capability of acquiring contents from the outside and reproducing them. Also, the content renderer 21 branches to the ACR client 22 all contents displayed on a display device such as the TV set incorporating the terminal apparatus 20. That is, the content renderer 21 branches to the ACR client 22 not only the programs received by a tuner of the TV set incorporating the terminal apparatus 20 but also the contents input through various input terminals (e.g., HDMI (high-definition multimedia interface) terminal) of the TV set.

The ACR client 22 periodically extracts signature data from the content input from the content renderer 21, the extracted signature data being representative of a characteristic of the input content. The signature data may be extracted using any suitable method. For example, a watermark embedded in the content may be extracted and used as the signature data. As another example, a fingerprint of the content may be calculated based on a hash function for use as the signature data.

Where a fingerprint is used as signature data, it is possible to obtain the signature data that remains the same before and after the resolution, aspect rate, bit rate, or coding format of the content in question is converted.

Also, the ACR client 22 generates an ACR query that includes the extracted signature data, and transmits the generated ACR query to an ACR server 31 of the feed apparatus 30 over the Internet 12. And the ACR client 22 receives and holds an ACR response returned from the ACR server 31 in replay to the transmitted ACR query. Furthermore, the ACR client 22 analyzes the ACR response being held, and causes the application manager 23 accordingly to execute the application corresponding to the content being viewed.

The application manager 23 under control of the ACR client 22 acquires the application corresponding to the currently viewed content from an application server 33 over the Internet 12, and executes the acquired application. Also, the application manager 23 is in possession of a related metadata acquisition API (Application Program Interface), and uses the related metadata acquisition API to acquire from the ACR client 22 related metadata corresponding to the currently executing application.

The user interface 24 allows the currently executing application to display diverse information on the display device. Also, the user interface 24 accepts the user's operations with regard to the currently executing application.

The feed apparatus 30 is made up of the ACR server 31, a content server 32, and the application server 33.

The ACR server 31 generates beforehand and retains ACR reference data associating the signature data extracted periodically from the content that may be viewed on the side of the terminal apparatus 20, with an application identifier, related metadata, etc. The ACR server 31 generates an ACR response in reply to an ACR query transmitted from the ACR client 22 in the terminal apparatus 20, and transmits the generated ACR response to the ACR client 22 via the Internet 12.

The content server 32 distributes contents over the broadcast network 11, and feeds the distributed contents and their related metadata to the ACR server 31.

The ACR server 31, content server 32, and application server 33 making up the feed apparatus 30 may be set up at one location in concentrated fashion, or may be located in a distributed manner. Also, the ACR server 31, content server 32, and application server 33 may be suitably combined with one another when installed.

[Typical Detailed Structure of the ACR Client 22]

Figure 2:
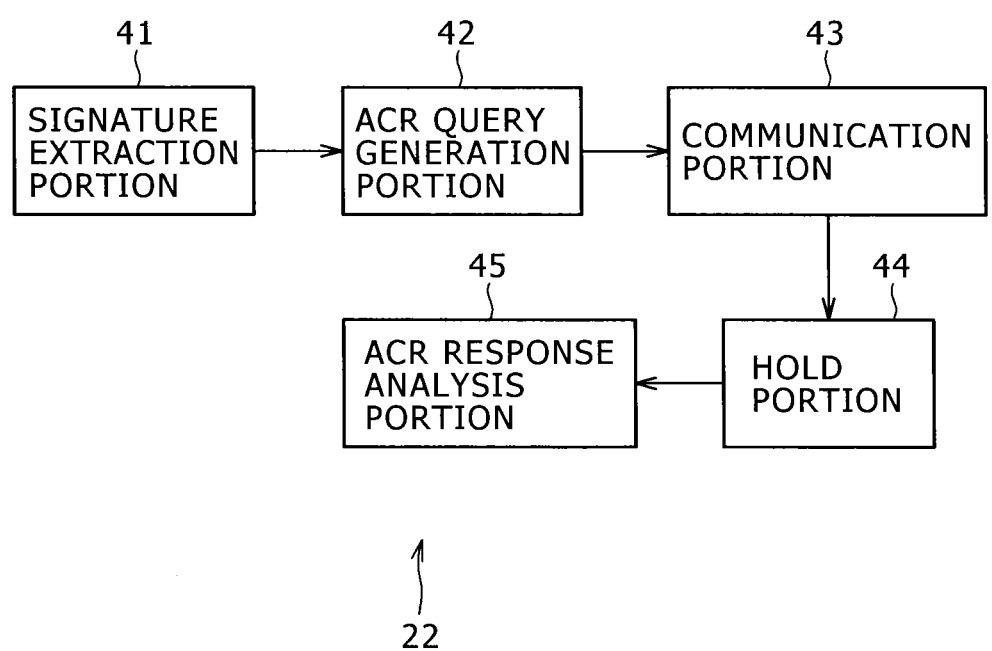
FIG. 2 is a block diagram showing a typical structure of an ACR (Automatic Content Recognition) client.

FIG. 2 shows a typical detailed structure of the ACR client 22 constituting part of the terminal apparatus 20.

The ACR client 22 is made up of a signature extraction portion 41, an ACR query generation portion 42, a communication portion 43, a hold portion 44, and an ACR response analysis portion 45.

Figure 3:
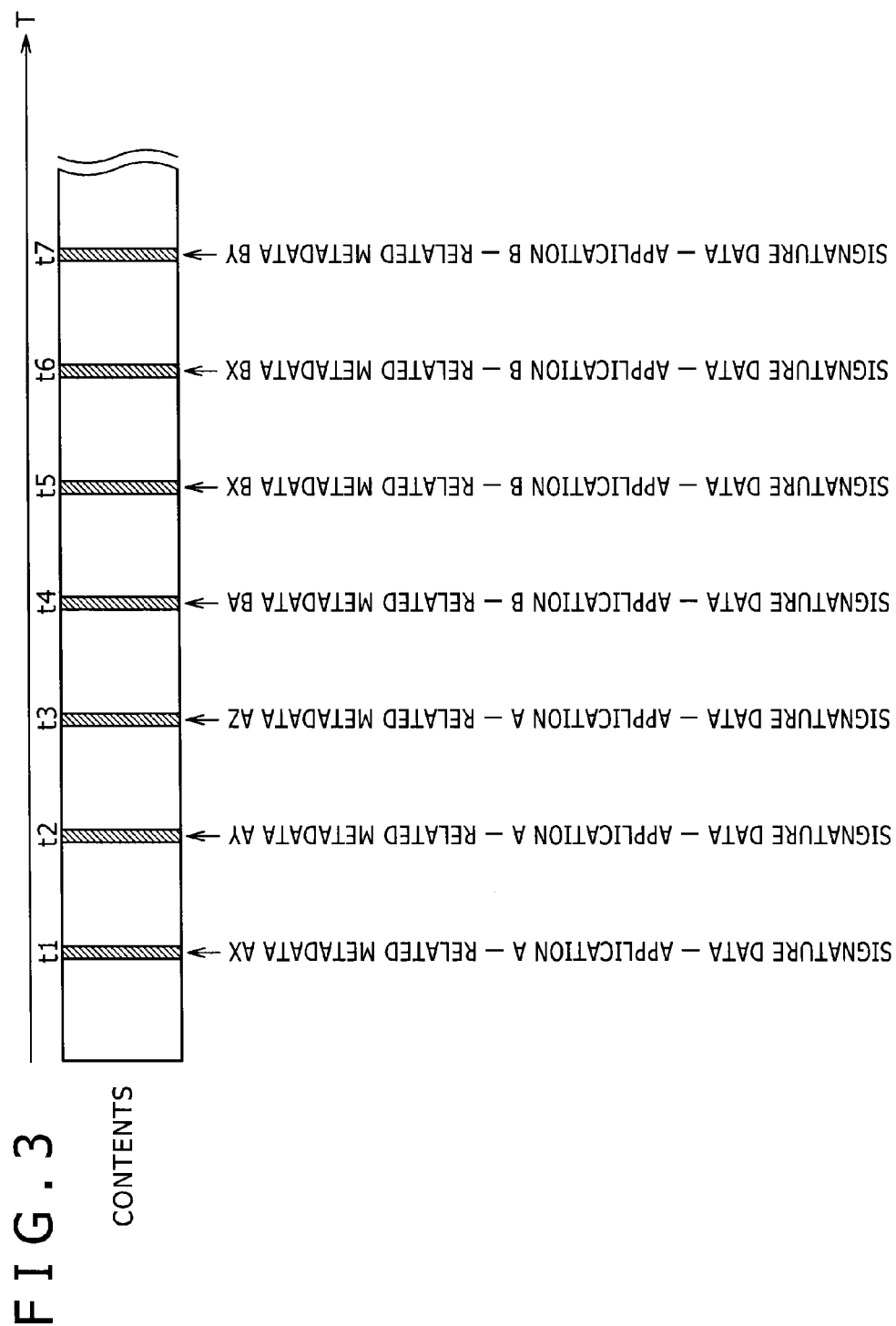
FIG. 3 is a schematic view outlining how signature data is extracted periodically from contents.

As shown in FIG. 3, the signature extraction portion 41 periodically extracts signature data from the content input from the content renderer 21 using a predetermined extraction method, and outputs the signature data representative of a characteristic of the input content to the ACR query generation portion 42. The user may be allowed to set the extraction period and extraction timing of the signature data as desired.

Every time signature data is input from the signature extraction portion 41, the ACR query generation portion 42 generates an ACR query including the input signature data. The data structure of the ACR query will be discussed later in reference to FIG. 5.

The communication portion 43 transmits the ACR query generated by the ACR query generation portion 42 to the ACR server 31 in the feed apparatus 30 over the Internet 12. Also, the communication portion 43 receives an ACR response returned from the ACR server 31 and outputs the received ACR response to the hold portion 44.

The hold portion 44 holds the ACR response and, upon request from the related metadata acquisition API of the application manager 23, feeds the related metadata included in the ACR response to the API. If the ACR response including the related metadata requested by the related metadata acquisition API is not held in the hold portion 44, the hold portion 44 transmits an ACR query to the ACR server 31 so as to acquire an ACR response containing the related metadata requested.

The ACR response analysis portion 45 analyzes the ACR response returned from the ACR server 31, identifies accordingly the application to be executed in interlocked relation to the content being viewed, and notifies the application manager 23 of the identified application.

[Typical Detailed Structure of the ACR Server 31]

Figure 4:
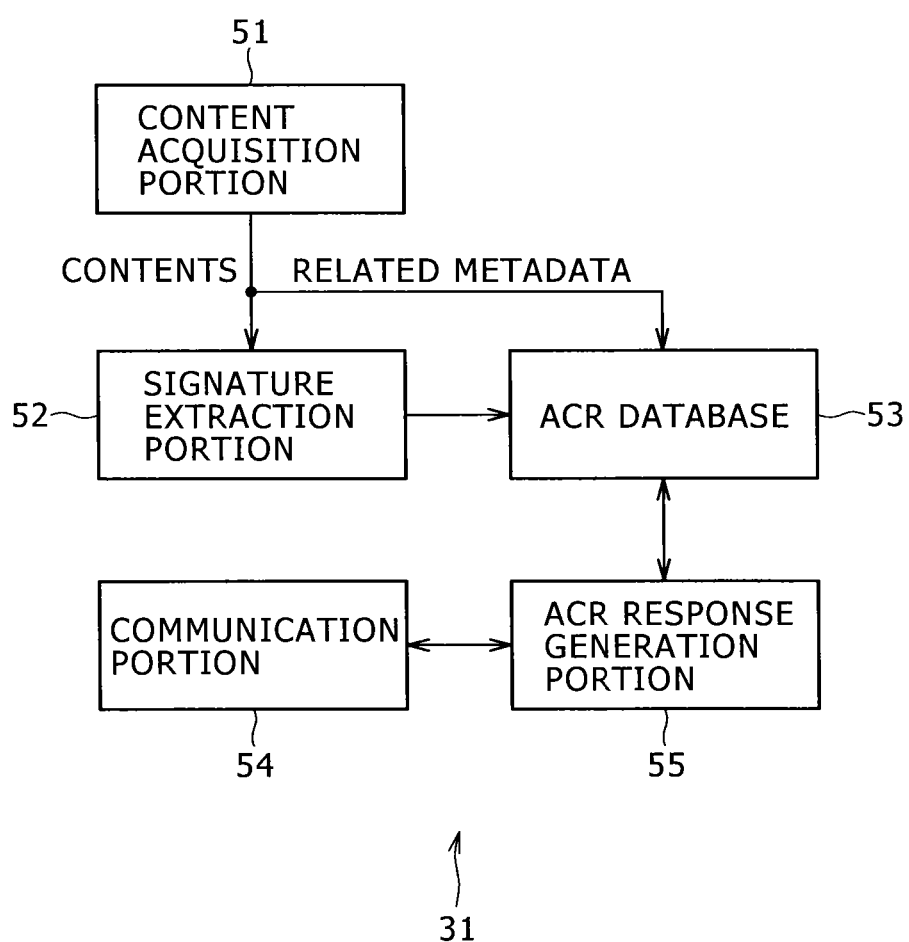
FIG. 4 is a block diagram showing a typical structure of an ACR server.

FIG. 4 shows a typical detailed structure of the ACR server 31 constituting part of the feed apparatus 30.

The ACR server 31 is made up of a content acquisition portion 51, a signature extraction portion 52, an ACR database 53, a communication portion 54, and an ACR response generation portion 55.

The content acquisition portion 51 acquires various contents that may be viewed on the side of the terminal apparatus 20 along with their related metadata from the content server 32 or the like, feeds the acquired contents to the signature extraction portion 52, and supplies the related metadata acquired to the ACR database 53.

As shown in FIG. 3, the signature extraction portion 52 periodically extracts signature data from the content input from the content acquisition portion 51 using a predetermined extraction method, the signature data being representative of a characteristic of the input content, and outputs the extracted signal data to the ACR database 53.

The ACR database 53 generates ACR reference data by associating the signature data input from the signature extraction portion 52 with the content from which the signature data was extracted, with the application to be interlocked, with related metadata, etc., and holds the generated ACR reference data. Alternatively, ACR reference data generated beforehand may be fed to and held in the ACR database 53. The data structure of the ACR reference data will be discussed later in reference to FIG. 6.

The communication portion 54 receives an ACR query transmitted from the ACR client 22 in the terminal apparatus 20 over the Internet 12 and outputs the received ACR query to the ACR response generation portion 55. Also, the communication portion 54 transmits an ACR response generated by the ACR response generation portion 55 to the ACR client 22 of the terminal apparatus 20 over the Internet 12.

The ACR response generation portion 55 references the ACR reference data in the ACR database 53 to identify the content corresponding to the signature data included in the ACR query transmitted from the ACR client 22 in the terminal apparatus 20. Furthermore, the ACR response generation portion 55 generates an ACR response including a content identifier identifying the result of the identification, an application identifier identifying the application to be executed in interlocked relation to the progress of the identified content, and related metadata for use by the identified application, and outputs the generated ACR response to the notification portion 54.

Where the ACR response generation portion 55 generates an ACR response, a communication delay of the ACR response over the Internet 12 is assumed on the basis of an extraction local timestamp 75 (FIG. 5) included in the ACR query, and related metadata to be included in the ACR response is selected in consideration of the processing time of the ACR response generation portion 55 itself. The data structure of the ACR response will be discussed later in reference to FIGS. 7A and 7B.

[Data Structure of the ACR Query]

Figure 5:
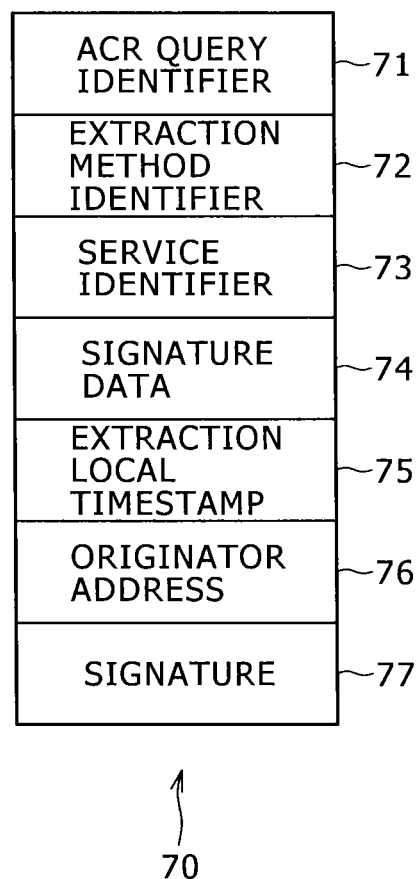
FIG. 5 is a schematic view showing a data structure of an ACR query.

FIG. 5 shows a data structure of an ACR query. The ACR query 70 includes an ACR query identifier 71, an extraction method identifier 72, a service identifier 73, signature data 74, an extraction local timestamp 75, an originator address 76, and a signature 77.

The ACR query identifier 71 is information identifying the ACR query 70. The extraction method identifier 72 is information identifying the extraction method used to extract the signature data 74. The service identifier 73 is information selecting the service by which to transmit the ACR query where there exist a plurality of services that identify the content based on the signature data 74.

The signature data 74 is extracted from the content by the signature extraction portion 41. The extraction local timestamp 75 denotes the timing at which the signature data 74 was extracted by the signature extraction portion 41, the timing being indicated by the time on a local system clock of the terminal apparatus 20.

The originator address 76 is information denoting the terminal apparatus 20 originating the ACR query 70, i.e., information denoting the destination to which to return the ACR response generated by the ACR server 31 in reply to the ACR query 70. The signature 77 is provided to prevent the ACR query 70 from getting falsified through communication paths. Also, it is possible to prevent falsification of the ACR query 70 by encrypting the entire ACR query 70 before it is transmitted.

[Data Structure of the ACR Reference Data]

Figure 6:
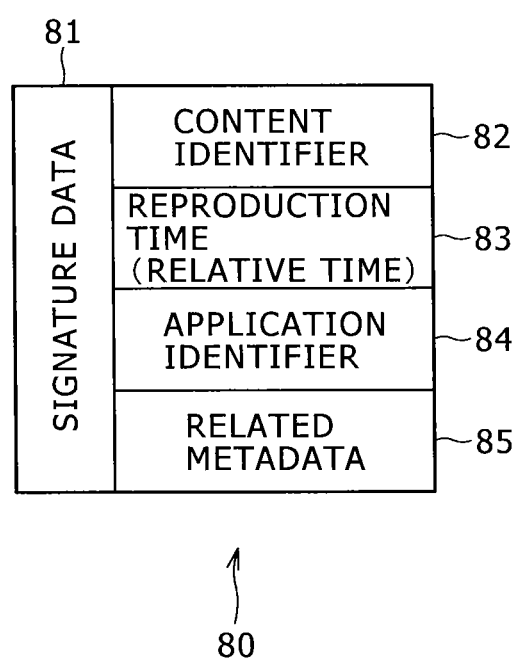
FIG. 6 is a schematic view showing a data structure of ACR reference data.

FIG. 6 shows a data structure of ACR reference data. In the ACR reference data 80, a content identifier 82, a reproduction time 83, an application identifier 84, and related metadata 85 are recorded in association with signature data 81.

The signature data 81 is extracted from the content by the signature extraction portion 52. The content identifier 82 is information identifying the content from which the signature data 81 was extracted. The reproduction time 83 denotes the timing at which the signature data 81 was extracted from the content identified by the content identifier 82, the timing being indicated by the elapsed time from the beginning of the content identified by the content identifier 82.

The application identifier 84 is information identifying the application to be executed in interlocked relation to the progress timing, denoted by the reproduction time 83, of the content identified by the content identifier 82. The related metadata 85 includes diverse information (data to be displayed, etc.) for use by the application identified by the application identifier 84.

[Data Structure of the ACR Response]

Figure 7A:
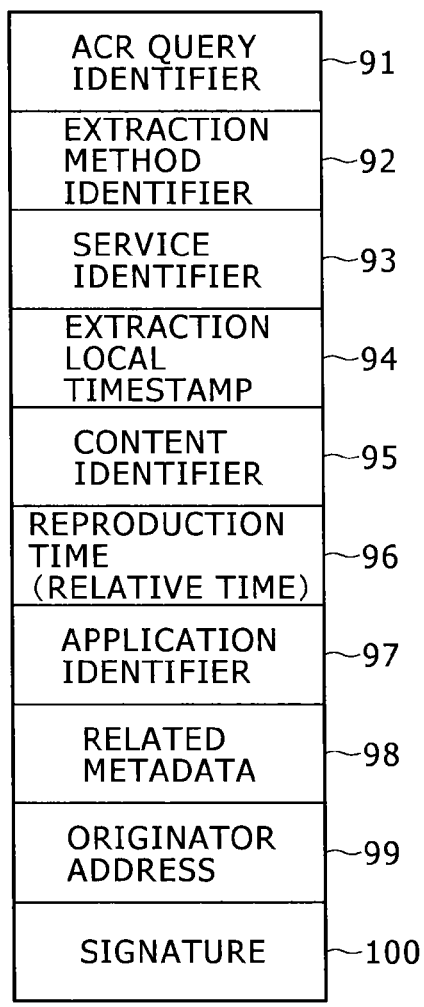
FIGS. 7A and 7B are schematic views showing data structures of ACR responses.
Figure 7B:
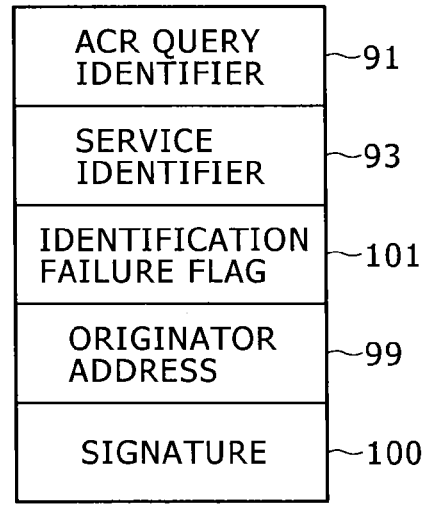

FIGS. 7A and 7B show data structures of ACR responses. FIG. 7A indicates the data structure of an ACR response in effect when the content being viewed at the terminal apparatus 20 is identified by referencing the ACR reference data 80 in the ACR database 53, and FIG. 7B shows the data structure of an ACR response in effect when the content is not identified.

The ACR response 90 (FIG. 7A) in effect when the content being viewed at the terminal apparatus 20 is identified contains an ACR query identifier 91, an extraction method identifier 92, a service identifier 93, an extraction local timestamp 94, a content identifier 95, a reproduction time 96, an application identifier 97, related metadata 98, an originator address 99, and a signature 100.

The ACR response 90 (FIG. 7B) in effect when the content being viewed at the terminal apparatus 20 is not identified contains an ACR query identifier 91, a service identifier 93, an originator address 99, a signature 100, and an identification failure flag 101.

The items ranging from the ACR query identifier 91 to the extraction local timestamp 94 are for identifying the ACR query 70 that served as a trigger to generate the ACR response 90; these items are represented by the identifiers ranging from the ACR query identifier 71 to the service identifier 73 and the extraction local timestamp 75 in the corresponding ACR query 70.

The content identifier 95 is information denoting the identified content, and is represented by the content identifier 82 in the ACR reference data 80. The reproduction time 96 is information denoting the progress time of the identified content, and is represented by the reproduction time 83 in the ACR reference data 80.

The application identifier 97 is information identifying the application to be executed in interlocked relation to the progress time indicated by the reproduction time 96 of the identified content, and is represented by the application identifier 84 in the ACR reference data 80. Also, the application identifier 97 is information indicating where this application was acquired (i.e., from the application server 33).

The related metadata 98 includes diverse information (data to be displayed, etc.) for use by the application identified by the application identifier 97 in keeping with the progress time indicated by the reproduction time 96, and is represented by the related metadata 85 in the ACR reference data 80. Also, by changing the application identifier 97 and related metadata 98 during the progress period of the same content, it is possible to change the content to be started in interlocked relation to the progress of the content or to change the information to be displayed.

The originator address 99 is information denoting the ACR server 31 that transmits the ACR response 90. The signature 100 is provided to prevent the ACR response 90 from getting falsified through communication paths. Also, it is possible to prevent falsification of the ACR response 90 by encrypting the entire ACR response 90 before it is transmitted. The identification failure flag 101 indicates that no content corresponding to the signature data 74 in the ACR query 70 was identified upon reference to the ACR reference data 80.

[Operations of the Interlocked Application Feed System]

FIG. 8 is a flowchart explanatory of how the interlocked application feed system operates.

For the ensuing explanation of processing, it is assumed that the ACR database 53 of the ACR server 31 constituting part of the feed system 30 holds the ACR reference data 80 generated in advance.

A TV set incorporating the terminal apparatus 20 reproduces content. That is, when the user starts viewing content, the content renderer 21 of the terminal apparatus 20 branches the currently viewed content to the ACR client 22 in step S1. In the ACR client 22, the signature extraction portion 41 extracts signature data periodically from the currently viewed content and outputs the extracted signature data to the ACR query generation portion 42.

In step S2, the ACR query generation portion 42 generates an ACR query 70 including the signature data input from the signature extraction portion 41 and outputs the generated ACR query 70 to the communication portion 43. The communication portion 43 transmits the generated ACR query 70 to the ACR server 31 in the feed apparatus 30 over the Internet 12.

Meanwhile, in step S11, the ACR server 31 in the feed apparatus 30 waits for the communication portion 54 to receive the ACR query 70 transmitted from the ACR client 22 in the terminal apparatus 20. Upon receipt of the ACR query 70 by the communication portion 54, control is passed on to step S12.

In step S12, the ACR response generation portion 55 references the ACR reference data 80 in the ACR database 53, thereby to identify the content corresponding to the signature data 74 included in the ACR query 70 transmitted from the ACR client 22 in the terminal apparatus 20.

In step S13, the ACR response generation portion 55 generates the ACR response 90 shown in FIG. 7A or 7B in accordance with the result of the content identification, and outputs the ARC response 90 to the notification portion 54. The communication portion 54 transmits the generated ACR response 90 to the ACR client 22 in the terminal apparatus 20 over the Internet 12.

Upon receiving and holding the ACR response 90, the ACR client 22 goes to step S3 where the ACR response analysis portion 45 analyzes the retained ACR response 90 and notifies the application manager 23 of the content identifier 95 and application identifier 97 found in the analyzed response. In accordance with this notification, the application manager 23 acquires the application identified by the content identifier 95 from the application server 33 over the Internet 12 and executes the acquired application.

Furthermore, the application manager 23 gives the related metadata acquisition API the content identifier 95 and application identifier 97 as arguments, thereby causing the related metadata acquisition API to acquire from the ACR client 22 the related metadata 98 corresponding to the executing application.

At this point, the related metadata acquisition API also notifies the application manager 23 of the local timestamp in effect when the related metadata 98 was acquired from the ACR client 22 and of the extraction local timestamp 94 acquired from the ACR response 90 held in the ACR client 22. The application manager 23 and the application executed thereby can process the related metadata in consideration of the time difference between these two local timestamps.

The operations explained above are repeated while the content is being viewed. This makes it possible to execute applications in interlocked relation to the progress of the currently viewed content.

By use of interlocked applications, it is possible to display information related to the content, implement quizzes or polls that can be participated in by viewers, recommend other contents, or have them downloaded.

Incidentally, the terminal apparatus 20 and feed apparatus 30 executing the above-described series of processes may be either constituted by hardware or implemented by software run on computers. The computers may include those built in dedicated hardware and those capable of carrying out diverse functions using various programs installed therein, such as general-purpose personal computers.

Figure 9:
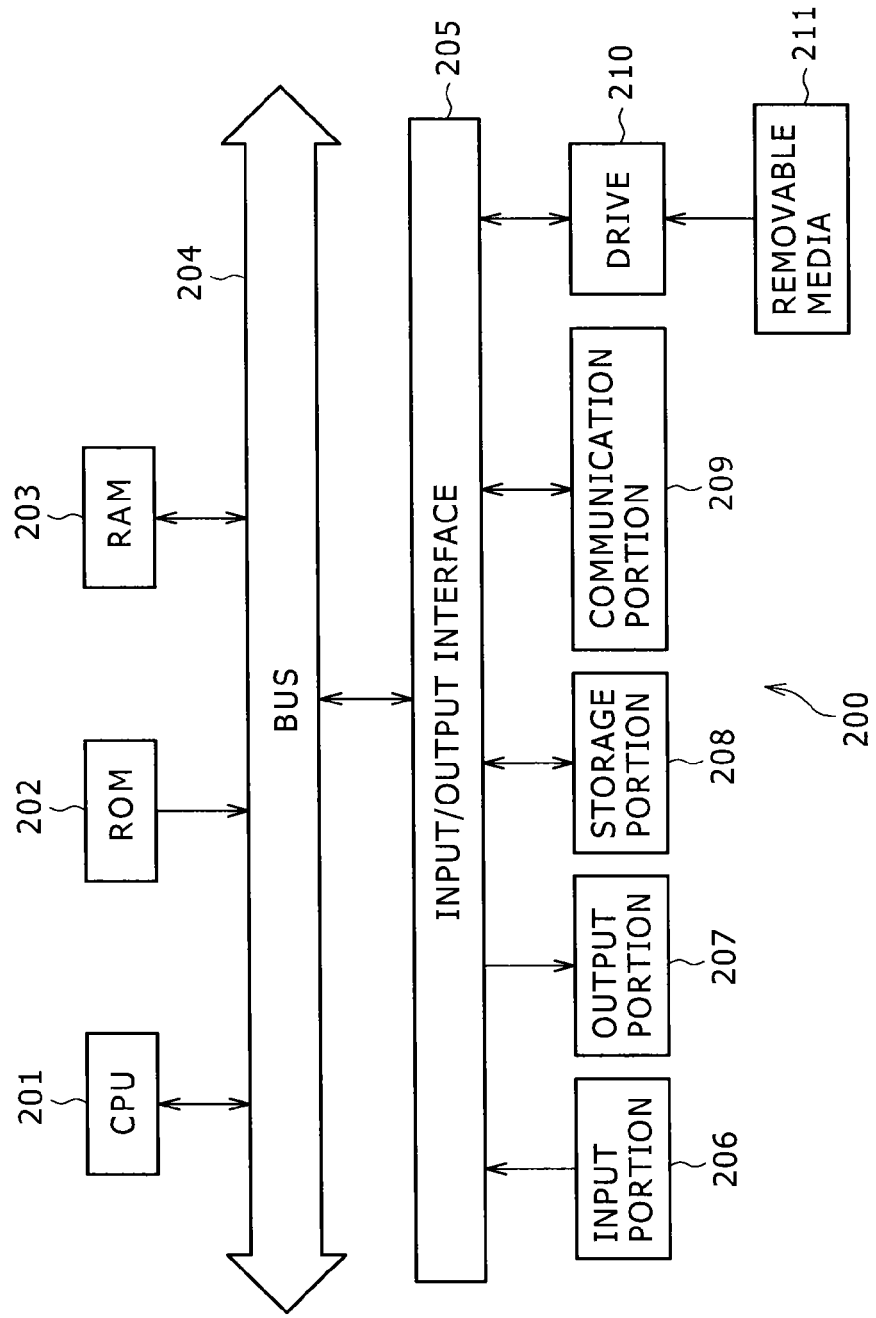
FIG. 9 is a block diagram showing a typical structure of a computer.

FIG. 9 is a block diagram showing a typical structure of hardware constituting such above-described computer.

In this computer 200, a CPU (Central Processing Unit) 201, a ROM (Read Only Memory), and a RAM (Random Access Memory) 203 are interconnected via a bus 204.

An input/output interface 205 is also connected to the bus 204. The input/output interface 205 is connected with an input portion 206, an output portion 207, a storage portion 208, a communication portion 209, and a drive 210.

The input portion 206 is made up of a keyboard, mouse, a microphone, etc. The output portion 207 is composed of a display, speakers, etc. The storage portion 208 is constituted by a hard disk, a nonvolatile memory, etc. The communication portion 209 is formed by a network interface, etc. The drive 210 drives removable media 211 such as a magnetic disk, an optical disk, a magneto-optical disk, or a semiconductor memory.

In the computer 200 structured as outlined above, the CPU 201 performs the above-described series of processes by loading programs from, for example, the storage portion 208 into the RAM 203 for execution by way of the input/output interface 205 and bus 204.

The programs to be executed by the computer 200 (CPU 201) may be offered recorded on, for example, the removable media 211 in the form of package media or the like. Also, the programs may be offered transmitted via wired or wireless transmission media such as local area networks, the Internet, and digital satellite broadcasts.

In the computer 200, the programs may be installed into the storage portion 208 via the input/output interface 205 from the removable media 211 attached to the drive 210. Also, the programs may be received by the communication portion 209 via wired or wireless transmission media before being installed into the storage portion 208. Otherwise, the programs may be preinstalled in the ROM 202 or storage portion 208.

Also, the programs for execution by the computer 200 may be processed in the depicted sequence of this specification (i.e., on a time series basis), in parallel, or in otherwise appropriately timed fashion such as when they are invoked.

Also, it should be understood that the present disclosure when embodied is not limited to the above-described embodiments and that various modifications, variations or alternatives may be made of this disclosure so far as they are within the spirit and scope thereof.

What is claimed is:

1. A terminal apparatus comprising:
   circuitry configured to
   extract signature data from a content received from a broadcast network, the content being identifiable by the signature data;
   generate a query including the extracted signature data;
   transmit the generated query to a server apparatus and receive a response returned therefrom in reply to said query, the response including an application identifier associated with the content and time information indicative of a point of time within the content;
   acquire, from an application server, an application corresponding to the application identifier included in the received response;
   output the content for display to a user; and
   execute the application based on the time information when the content is being displayed.

2. The terminal apparatus according to claim 1, wherein
   said circuitry is configured to generate said query including said extracted signature data and an extraction timestamp indicative of the timing at which said signature data was extracted; and
   either said circuitry or the application executed thereby performs a predetermined process by acquiring related metadata selected by said server apparatus based on said extraction timestamp included in said query.

3. The terminal apparatus according to claim 2, wherein said terminal apparatus is incorporated in a reproduction apparatus configured to display audio or video contents to the user.

4. The terminal apparatus according to claim 1, wherein said circuitry is further configured to acquire the application from the application server via the Internet.

5. The terminal apparatus according to claim 1, wherein the signature data is watermark information embedded in the content.

6. The terminal apparatus according to claim 1, wherein the signature data is fingerprint information calculated based on the content and a predetermined function.

7. An information processing method for use with a terminal apparatus, said information processing method comprising:
   causing said terminal apparatus to extract signature data from a content received from a broadcast network, the content being identifiable by the signature data;
   causing said terminal apparatus to generate a query including the extracted signature data;
   causing said terminal apparatus to transmit the generated query to a server apparatus and receive a response returned therefrom in reply to said query, the response including an application identifier associated with the content indicative of a point of time within the content;
   causing said terminal apparatus to acquire, from an application server, an application corresponding to the application identifier included in the received response;
   causing said terminal apparatus to output the content for display to a user; and
   causing said terminal apparatus to execute the application based on the time information when the content is being displayed.

8. The information processing method according to claim 7, wherein the signature data is watermark information embedded in the content.

9. The information processing method according to claim 7, wherein the signature data is fingerprint information calculated based on the content and a predetermined function.

10. A non-transitory computer-readable storage medium storing a program for causing a computer to:
    extract signature data from a content received from a broadcast network, the content being identifiable by the signature data;
    generate a query including the extracted signature data;

transmit the generated query to a server apparatus and receive a response returned therefrom in reply to said query, the response including an application identifier associated with the content and time information indicative of a point of time within the content;

acquire, from an application server, an application corresponding to the application identifier included in the received response;

output the content for display to a user; and execute the application based on the time information when the content is being displayed.

11. A server apparatus comprising:

circuitry configured to hold reference data associating signature data extracted from a content that is transmitted over a broadcast network with a content identifier identifying said content from which said signature data was extracted and with an application identifier identifying an application;

identify in reference to said reference data the content from which was extracted the signature data included in a query transmitted from a terminal apparatus so as to generate a response including the application identifier and time information indicative of a point of time within the content and corresponding to the application, said application identifier identifying the application to be acquired by the terminal apparatus from an application server and to be executed based on the time information when the content is being displayed; and transmit the generated response to said terminal apparatus in reply to the query from the terminal apparatus.

12. The server apparatus according to claim 11, wherein said circuitry holds the reference data further associating the signature data extracted from the content with said time information including a reproduction time indicative of the timing at which said signature data was extracted, and with related metadata to be processed by said application; and said circuitry is further configured to identify in reference to said reference data the content from which was extracted the signature data included in the query transmitted from said terminal apparatus, so as to generate said response including said time information, said application identifier identifying the application, and said related metadata.

13. The server apparatus according to claim 12, wherein said circuitry is further configured to identify in reference to said reference data the content from which was extracted the signature data included in the query transmitted from said terminal apparatus, so as to generate said response including said time information, said application identifier identifying the application, and said related metadata selected based on an extraction timestamp included in said query.

14. The server apparatus according to claim 13, wherein said circuitry is further configured to generate said response including the content identifier representative of the identified content.

15. The server apparatus according to claim 11, wherein said time information indicates a progress of time of the content.

16. An information processing method for use with a server apparatus, said information processing method comprising:

causing said server apparatus to, receive a query transmitted from a terminal apparatus, the query includes signature data extracted from a content received from a broadcast network;

causing said server apparatus to, referring to reference data associating the signature data extracted from the content with a content identifier identifying said content from which said signature data was extracted and with an application identifier identifying an application, generate a response including the application identifier and time information corresponding to the application, said application identifier identifying the application to be acquired by the terminal apparatus from an application server and to be executed based on the time information when the content is being displayed; and causing said server apparatus to transmit the generated response to said terminal apparatus in reply to the query from the terminal apparatus.

17. A non-transitory computer-readable storage medium storing a program for causing a computer to:

hold reference data associating signature data extracted from a content that is transmitted over a broadcast network with a content identifier identifying said content from which said signature data was extracted and with an application identifier identifying an application, identify in reference to said reference data the content from which was extracted the signature data included in a query transmitted from the terminal apparatus so as to generate a response including the application identifier and time information corresponding to the application, said application identifier identifying the application to be acquired by the terminal apparatus from an application server and to be executed based on the time information when the content is being displayed; and transmit the generated response to said terminal apparatus in reply to the query from the terminal apparatus.

18. A system comprising:

a terminal apparatus, and a server apparatus;

wherein said terminal apparatus includes circuitry configured to extract signature data from a content received from a broadcast network, the content being identifiable by the signature data, generate a query including the extracted signature data, transmit the generated query to said server apparatus and receive a response returned therefrom in reply to said query, the response including an application identifier associated with the content and time information indicative of a point of time within the content, acquire, from an application server, an application corresponding to the application identifier included in the received response, output the content for display to a user, and execute the application based on the time information when the content is being displayed; and said server apparatus includes circuitry configured to hold reference data associating the signature data extracted from the content with a content identifier identifying said content from which said signature data was extracted and with the application identifier identifying the application identify in reference to said reference data the content from which was extracted the signature data included in said query transmitted from said terminal apparatus so as to generate said response including the application identifier and said time information corresponding to the application, and transmit the generated response to said terminal apparatus in reply to the query from the terminal apparatus.

19. The system according to claim 18, wherein the signature data is watermark information embedded in the content.

20. The system according to claim 18, wherein the signature data is fingerprint information calculated based on the content and a predetermined function.

\* \* \* \* \*